United States Patent Office 3,086,025
Patented Apr. 16, 1963

3,086,025
POLYEPOXY-1,3-DIOXOLANES
Samuel W. Tinsley, Jr., and Donald L. MacPeek, South Charleston, W. Va., assignors to Union Carbide Corporation, a corporation of New York
No Drawing. Filed Mar. 21, 1960, Ser. No. 16,134
13 Claims. (Cl. 260—340.9)

This invention relates, in general, to a new class of organic compounds and more particularly to novel epoxy acetals. In one aspect, this invention relates to epoxy-substituted 1,3-dioxolanes and methods for their preparation.

The novel compounds of this invention, hereinafter referred to as epoxy acetals, can be conveniently represented by the following general formula:

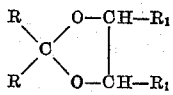

wherein R is a member selected from the group consisting of hydrogen and aliphatic, alicyclic and aromatic groups and wherein $R_1$ is an epoxyalkyl group. Preferred compounds represented by the aforesaid formula are those containing from 2 to 4 epoxy groups and wherein R contains not more than 22 carbon atoms, more preferably not more than 18 carbon atoms, and still more preferably not more than 7 carbon atoms, either as a straight chain, branched chain or part of a ring system. Particularly preferred epoxy acetals are those compounds wherein R is alkyl, aryl, alkenyl, cycloalkyl, alkylcycloalkyl, cycloalkenyl, alkylcycloalkenyl, cycloalkenylalkyl, bicycloalkyl, bicycloalkenyl, bicycloalkenylalkyl, epoxyalkyl, epoxycycloalkyl, alkylepoxycycloalkyl, epoxybicycloalkyl and $R_1$ is an epoxyalkyl group containing from 2 to 8 carbon atoms.

It should be noted that the novel acetal compounds of this invention can be either difunctional or polyfunctional depending upon the number of reactive groups present in the molecule. For example, the novel epoxy acetals encompassed by the first embodiment of the present invention, as hereinafter described, contain but two epoxy groups and no other reactive group in the molecule. The second embodiment includes compounds of a polyfunctional nature in that the R group contains one or more epoxy groups and can also contain olefinic unsaturation either in place of, or in conjunction with one of the epoxy groups.

By the term "epoxyalkyl" as employed throughout the specification and claims is meant an alkyl group to one pair of vicinal carbon atoms of which oxirane oxygen is attached.

Due to the presence of the epoxy group,

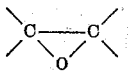

the novel compounds of this invention are useful in the preparation of epoxy resins. Particularly noteworthy, are the di- and tri-epoxy acetals which form excellent compositions when hardened with polyamides, polyacids, anhydrides, and the like. Additionally, the epoxy acetals which contain one or more double bonds are useful as monomers for copolymerization with vinyl compounds to give coatings and films which may be cross-linked through the epoxy group itself. The novel epoxy acetals of this invention are also valuable as stabilizers for chlorine-containing resins. For example, the novel compounds of this invention containing two epoxy groups have been found useful as plasticizers with vinyl halide resins. By incorporating into the resin from about 5 to about 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. The compounds of this invention may be used alone or in conjunction with conventional plasticizers.

A particularly interesting novel class of compounds included within the scope of the present invention embraces epoxy acetal compounds which contain a reactive double bond in the molecule as well as the two epoxy groups. These compounds are especially useful and differ from compounds lacking unsaturation in that they can be converted to polymers through either the oxirane ring or the polymerizable double bond and thereafter cross-linked through whichever of the two types of groups was not used in the initial polymerization. Many of the resulting polymeric materials are useful as lubricants and as hydraulic fluids where high temperatures are encountered. Thus, the epoxy acetals of this invention which contain a polymerizable bond are particularly useful since they can be incorporated into polymers through the polymerizable linkage and the epoxy group subsequently used for cross-linking the resin.

It is accordingly an object of the present invention to provide new organic compounds which are suitable for use in the plastic and resin field. Another object is to provide new compositions of matter comprising epoxy acetals. A further object of the present invention is to provide new compositions of matter comprising the epoxy 1,3-dioxolanes. Another object is to provide novel acetals containing two or more epoxy groups. A still further object of the present invention is to provide novel compounds having polyfunctional properties in that they contain either two or more epoxy groups or two epoxy groups and one or more reactive olefinic groups within the same molecule. Another object is to provide a process for the preparation of the novel compositions of matter of this invention. These and other objects will readily become apparent to those skilled in the art in the light of the teachings herein set forth.

In its broad aspect, this invention is directed to novel epoxy acetals of the aforementioned general formula which contain from 2 to 4 epoxy groups and which can also contain from 1 to 3 olefinic groups in the molecule.

In one embodiment of the present invention the novel epoxy acetals are represented by the aforementioned formula wherein only the $R_1$ groups contain an epoxy group. Preferred compounds are those represented by the class formula:

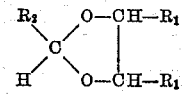

wherein $R_2$ represents hydrogen, alkyl, aryl, cycloalkyl, alkylcycloalkyl, or bicycloalkyl groups containing not more than 18 carbon atoms and more preferably not more than 7 carbon atoms, and $R_1$ represents an epoxy alkyl group containing from 2 to 8 carbon atoms and more preferably from 2 to 4 carbon atoms. Particularly preferred compounds are those represented by the class formula:

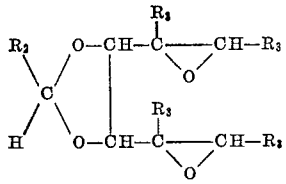

wherein $R_2$ is the same as previously indicated, and wherein $R_3$ is a member selected from the group consisting of hydrogen and lower alkyl groups of from 1 to 3 carbon atoms.

The following compounds illustrate the novel epoxy acetals of this embodiment of the present invention:

2-methyl-4,5-di(1-methyl-1,2-epoxyethyl)-1,3-dioxolane;
2-propyl-4,5-di(1-methyl-1,2-epoxyethyl)-1,3-dioxolane;
2-propyl-4,5-di(1-ethyl-1,2-epoxypropyl)-1,3-dioxolane;
2-nonyl-4,5-di(1-methyl-1,2-epoxyethyl)-1,3-dioxolane;
2-heptadecyl-4,5-di(epoxyethyl)-1,3-dioxolane;
2-phenyl-4,5-di(1-methyl-1,2-epoxyethyl)-1,3-dioxolane;
2-naphthyl-4,5-di(1,2-epoxypropyl)-1,3-dioxolane;
2-(6-methylcyclohexyl)-4,5-di(1-methyl-1,2-epoxyethyl)-1,3-dioxolane;
2-(2-bicyclo[2.2.1]heptyl)-di(1-methyl-1,2-epoxy-ethyl)-1,3,dioxolane.

In a second embodiment of the present invention the novel epoxy acetals are represented by the aforesaid general formula wherein two epoxy groups are present in the molecule and at least one additional functional group which is a member selected from the group of epoxy and olefinic groups. These polyfunctional compounds include those wherein at least one R of the general formula contains one or more epoxy or olefinic groups. Preferred compounds are those represented by the class formula:

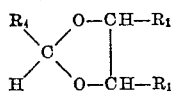

wherein $R_1$ is the same as previously indicated and $R_4$ is a member selected from the group consisting of alkenyl, cycloalkenyl, alkylcycloalkenyl, bicycloalkenyl, bicycloalkenylalkyl, epoxyalkyl, epoxycycloalkyl, alkylepoxycycloalkyl, and epoxybicycloalkyl groups containing not more than 18 carbon atoms and more preferably from 2 to 7 carbon atoms. Particularly preferred compounds are those represented by the class formula:

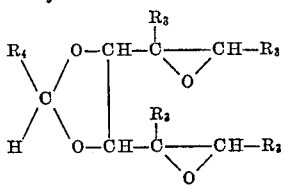

wherein $R_4$ and $R_3$ are as previously indicated.

The following compounds illustrate the novel epoxy acetals of the second embodiment of the present invention:

2-vinyl-5,4-di(1-methyl-1,2-epoxyethyl)-1,3-dioxolane;
2-vinyl-4,5-di(epoxyethyl)-1,3-dioxolane;
2-vinyl-4,5-di(1,2-epoxypropyl)-1,3-dioxolane;
2-(1,2-epoxyethyl)4,5-di(1-methyl-1,2-epoxyethyl)-1,3-dioxolane;
2-(2-propenyl)-4,5-di(1,2-epoxypropyl)-1,3-dioxolane;
2-(2,3-epoxypropyl) - 4,5 - di(1-methyl-1,2-epoxyethyl)-1,3-dioxolane;

2-(6-methyl-3-cyclohexenyl)-4,5-di(1-methyl-1,2-epoxyethyl)-1,3-dioxolane;
2-(6-methyl-3,4-epoxycyclohexyl)-4,5-di(1-methyl-1,2-epoxyethyl)-1,3-dioxolane.

In accordance with the process of this invention, the novel epoxy acetal compounds of the aforementioned embodiments can be produced in high yields by the epoxidation of the olefinic linkage contained in the unsaturated acetal starting material. In the epoxy acetals prepared from compounds containing only one double bond, the epoxidation is effected quite easily. In the acetals prepared from unsaturated compounds having more than one site of unsaturation, it has been observed that epoxidation can occur selectively. Thus, by appropriate combinations of different olefinic groups an essentially complete selectivity can be achieved in the preparation of many epoxy acetals. Compounds which contain double bonds of approximately the same reactivity toward epoxidation can usually not be selectively epoxidized unless the epoxidizing agent is reacted with a large excess of diolefin.

The starting materials for the production of the novel compounds of the present invention, as hereinabove indicated, are the corresponding unsaturated acetals. These compounds can be conveniently represented by the following general formula:

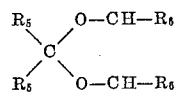

wherein $R_5$ is a member selected from the group consisting of hydrogen and aliphatic, alicyclic and aromatic groups and $R_6$ represents an alkenyl group of from 2 to 8 carbon atoms and more preferably from 2 to 4 carbon atoms. For the novel compounds of the second embodiment of the instant invention wherein $R_4$ contains one or more functional groups, at least one $R_5$ must contain one or more reactive olefinic linkages.

Particularly preferred starting materials are those compounds represented by the formula:

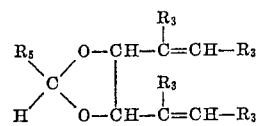

wherein $R_5$ and $R_3$ are as previously indicated.

The aforesaid starting materials are prepared, as indicated in the examples, by the condensation of glycols of the structure:

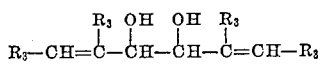

wherein $R_3$ is as previously defined, with the appropriate aldehyde or ketone to form the unsaturated acetal. Preferred glycols employed in the practice of this invention include, among others, 2,5-dimethyl-1,5-hexadiene-3,4-diol; 1,5-hexadiene-3,4-diol; 2,6-octadiene-4,5-diol; 3,6-diethyl-2,6-octadiene-4,5-diol; and 5,8-dipropyl-4,8-dodecadiene-6,7-diol. These glycols can be reacted with carbonyl-containing compounds to give the difunctional and polyfunctional starting materials. For purposes of illustration, 2,5-dimethyl-1,5-hexadiene-3,4-diol can be condensed with the following carbonyl-containing compounds to give the designated starting materials.

Saturated carbonyl compound:
    Formaldehyde
    Acetaldehyde
    Propionaldehyde
    Butyraldehyde
    Valeraldehyde
    Caproaldehyde
    Stearaldehyde
    Benzaldehyde
    1-naphthaldehyde Corresponding difunctional starting materials:
 4,5-diisopropenyl-1,3-dioxolane
 2-methyl-4,5-diisopropenyl-1,3-dioxolane
 2-ethyl-4,5-diisopropenyl-1,3-dioxolane
 2-propyl-4,5-diisopropenyl-1,3-dioxolane
 2-butyl-4,5-diisopropenyl-1,3-dioxolane
 2-pentyl-4,5-diisopropenyl-1,3-dioxolane
 2-heptadecyl-4,5-diisopropenyl-1,3-dioxolane
 2-phenyl-4,5-diisopropenyl-1,3-dioxolane
 2-naphthyl-4,5-diisopropenyl-1,3-dioxolane Upon epoxidation the aforementioned starting materials give the following respective novel epoxy acetals:

4,5-di(1-methyl-1,2-epoxyethyl)-1,3-dioxolane
2-methyl-4,5-di(1-methyl-1,2-epoxyethyl)-1,3-dioxolane
2-ethyl-4,5-di(1-methyl-1,2-epoxyethyl)-1,3-dioxolane
2-propyl-4,5-di(1-methyl-1,2-epoxyethyl)-1,3-dioxolane
2-butyl-4,5-di(1-methyl-1,2-epoxyethyl)1,3-dioxolane
2-pentyl-4,5-di(1-methyl-1,2-epoxyethyl)-1,3dioxolane
2-heptadecyl-4,5-di(1-methyl-1,2-epoxyethyl)-1,3-dioxolane
2-pentyl-4,5-di(1-methyl-1,2-epoxyethyl)-1,3-dioxolane
2-naphthyl-4,5-di(1-methyl-1,2-epoxyethyl)-1,3-dioxolane Unsaturated carbonyl compounds:
 Acrolein
 Crotonaldehyde
 3-butenaldehyde
 4-pentenaldehyde
 Bicyclo[2.2.1]-5-heptene-2-carboxaldehyde
 6-methyl-3-cyclohexenecarboxaldehyde Corresponding polyfunctional starting materials:
 2-vinyl-4,5-diisopropenyl-1,3-dioxolane
 2-(1-propenyl)-4,5-diisopropenyl-1,3-dioxolane
 2-(2-propenyl)-4,5-diisopropenyl-1,3-dioxolane
 2-(3-butenyl)-4,5-diisopropenyl-1,3-dioxolane
 2-(6-bicyclo[2.2.1]-2-heptenyl)-4,5-diisopropenyl-1,3-dioxolane
 2-(6-methyl-3-cyclohexenyl)-4,5-diisopropenyl-1,3-dioxolane Upon epoxidation the aforementioned polyfunctional starting materials give the following respective novel epoxy acetals:

2-vinyl-4,5-di(1-methyl-1,2-epoxyethyl)-1,3-dioxolane or,
2-(epoxyethyl)-4,5-di(1-methyl-1,2-epoxyethyl)-1,3-dioxolane,
2-(1-propenyl)-4,5-di(1-methyl-1,2-epoxyethyl)-dioxolane or,
2-(1,2-epoxypropyl)-4,5-di(1-methyl-1,2-epoxyethyl)-1,3-dioxolane,
2-(2-propenyl)-4,5-di(1-methyl-1,2-epoxyethyl)-1,3-dioxolane or,
2-(2,3-epoxypropyl)-4,5-di(1-methyl-1,2-epoxyethyl)-1,3-dioxolane,
2-(3-butenyl)-4,5-di(1-methyl-1,2-epoxyethyl)-1,3-dioxolane or,
2-(3-4-epoxybutyl)-4,5-di(1-methyl-1,2-epoxyethyl)-1,3-dioxolane,
2-(6-bicyclo-[2.2.1]-2-heptenyl)-4,5-di(1-methyl-1,2-epoxyethyl)-1,3-dioxolane or,
2-(7-tricyclo[3.2.1.0$^{2,4}$]-3-oxaoctyl)-4,5-di(1-methyl-1,2-epoxyethyl)-1,3-dioxolane,
2-(6-methyl-3-cyclohexenyl)-4,5-di(1-methyl-1,2-epoxyethyl)-1,3-dioxolane or,
2-(6-methyl-3,4-epoxycyclohexyl)-4,5-di(1-methyl-1,2-epoxyethyl)-1,3-dioxolane.

In a similar manner other glycols, such as those hereinbefore described, can be condensed with appropriate carbonyl-containing compounds and epoxidized to the novel compounds of this invention. Illustrative of such epoxy acetals are the following:

2-propyl-4,5-di(epoxyethyl)-1,3-dioxolane;
2-epoxyethyl-4,5-di(epoxyethyl)-1,3-dioxolane;
2-propyl-4,5-di(1,2-epoxypropyl)-1,3-dioxolane;
2-epoxyethyl-4,5-di(1,2-epoxypropyl)-1,3-dioxolane;
2-propyl-4,5-di(1-ethyl-1,2-epoxypropyl)-1,3-dioxolane;
2-vinyl-4,5-di(1-propyl-1,2-epoxypentyl)-1,3-dioxolane.

The epoxy acetals hereinabove described are only given for purposes of illustration of the novel compounds of this invention and are not intended to be limited solely to those disclosed.

Although the preferred compounds of this invention contain no elements other than carbon, hydrogen and oxygen, the novel compounds can include other substituents such as chloro, nitro and like groups.

In a preferred embodiment of the process of the present invention, the epoxidation of the unsaturated starting materials is carried out at temperatures in the range of from $-25°$ C. to $150°$ C. At the lower temperatures, the rate of epoxidation is slow, while at the higher temperatures, the rate is faster necessitating precautions to prevent further reaction of the epoxide groups. In order to avoid undesired side reactions and to provide a suitable reaction rate, temperatures in the range of from $10°$ C. to $90°$ C. are preferable. In the practice of the invention, the unsaturated starting material is conveniently charged to a reaction vessel and the appropriate quantity of peracetic acid is added. The mole ratio is not necessarily critical and can be varied over a wide range depending on whether the di- or polyepoxy compound is desired. The reaction is allowed to proceed for a time sufficient to consume approximately the theoretical quantity of peracetic acid needed to effect expoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxy acetal. Extraction with a suitable solvent, continuous distillation, or distillation under reduced pressures all are applicable to the recovery of the epoxidized compound.

Other peroxides such as perbenzoic acid, monoperphthalic acid, acetaldehyde monoperacetate, and hydroperoxides may be used as the epoxidizing agent, but for economic reasons, peracetic acid is more desirable for commercial application.

The following examples illustrate the practice of this invention:

EXAMPLE I

*2-Propyl-4,5-Di(1-Methyl-1,2-Epoxyethyl)-1,3-Dioxolane*

(A) 2-PROPYL-4,5-DIISOPROPENYL-1,3-DIOXOLANE

A mixture of 142 grams (1 mole) of 2,5-dimethyl-1,5-hexadiene-3,4-diol, 72 grams (1 mole) of n-butyraldehyde, 500 milliliters of benzene and 3 grams of p-toluenesulfonic acid was refluxed in a conventional still until 18 grams of water had been removed as the benzene-water azetrope. Then 3 grams of sodium methoxide were added to the reaction mixture which was subsequently flash distilled from residual material. Reduced pressure redistillation of the higher boiling cuts gave 166 grams (84.8 percent of the theoretical yield) of 2-propyl-4,5-diisopropenyl-1,3-dioxolane, boiling point=$42°$ C. at a pressure of 0.07 millimeter of mercury; refractive index, $n\ 30/D = 1.4482$; iodine value=246; theoretical=258.

(B) 2-PROPYL-4,5-DI(1-METHYL-1,2-EPOXYETHYL)-1,3-DIOXOLANE

A weight of 94 grams (0.5 mole) of 2-propyl-4,5-diisopropenyl-1,3-dioxolane was allowed to react for six hours at 50° C. with 345 grams (1.25 moles) of a 27.7 percent solution of peracetic acid in ethyl acetate. Conventional distillation techniques gave 63.9 grams (55.0 percent of the theoretical yield) of 2-propyl-4,5-di(1-methyl-1,2-epoxyethyl)-1,3-dioxolane, boiling point=98° C. to 102° C. at a pressure of 0.3 millimeter of mercury; refractive index, $n$ 30/D=1.4511 to 1.4919. Purity by epoxide analysis as determined by the pyridine hydrochloride method was 89.6 percent.

EXAMPLE II

*2-(6-Methyl-3,4-Epoxycyclohexyl)-4,5-Di(1-Methyl-1,2-Epoxyethyl)-1,3-Dioxolane*

(A) 2-(6-METHYL-3-CYCLOHEXENYL)-4,5-DIISOPROPENYL-1,3-DIOXOLANE

A mixture of 142 grams (1 mole) of 2,5-dimethyl-1,5-hexadiene-3,4-diol, 124 grams (1 mole) of 6-methyl-3-cyclohexenecarboxaldehyde, 500 milliliters of benzene and 3 grams of p-toluenesulfonic acid was refluxed at atmospheric pressure until no further benzene-water azeotrope appeared on distillation. The reaction mixture was then distilled after neutralization of the p-toluenesulfonic acid with sodium methoxide to give 196 grams (79.1 percent of the theoretical yield) of 2-(6-methyl-3-cyclohexenyl)-4,5-diisopropenyl-1,3-dioxolane, boiling point 97° C. at a pressure of 0.07 millimeter of mercury; refractive index, $n$ 30/D=1.4850 to 1.4852; purity by quantitative halogenation=96.8 percent.

(B) 2-(6-METHYL-3,4-EPOXYCYCLOHEXYL)-4,5-DI(1-METHYL-1,2-EPOXYETHYL)-1,3-DIOXOLANE

A weight of 92 grams (0.37 mole) of 2-(6-methyl-3-cyclohexenyl)-4,5-diisopropenyl-1,3-dioxolane was reacted in a manner similar to that of Example I with 359 grams (1.30 moles) of a 27.5 percent solution of peracetic acid in ethyl acetate at a temperature of 50° C. for six hours, after which time, analysis showed that 99 percent of the theoretical amount of peracetic acid had been consumed. Conventional distillation with ethylbenzene and vacuum fractionation gave 82 grams (75 percent of the theoretical yield) of 2-(6-methyl-3,4-epoxycyclohexyl)-4,5-di(1-methyl-1,2-epoxyethyl)-1,3-dioxolane, boiling point=170° C. at a pressure of 0.6 millimeter of mercury; refractive index, $n$ 30/D=1.4874 to 1.4875; purity by hydrogen bromide method=80.4 percent.

Although the invention has been illustrated by the preceding examples, the invention is not to be construed as limited to the materials employed in the above examples, but rather, the invention encompasses the generic invention as hereinbefore disclosed. Various modifications and embodiments of this invention can be made without departing from the spirit and scope thereof.

What is claimed is:

1. Epoxy acetals of the formula:

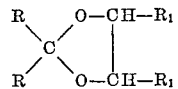

wherein R is a member selected from the group consisting of hydrogen, alkyl, carbocyclic aryl, cycloalkyl, alkylcycloalkyl, cycloalkenyl, alkylcycloakenyl, cycloalkenylalkyl, bicycloalkyl, bicycloalkenyl, bicycloalkenylalkyl, epoxyalkyl, epoxycycloalkyl, alkylepoxycycloalkyl and epoxybicycloalkyl groups of not more than 22 carbon atoms; $R_1$ is an epoxyalkyl group of from 2 to 8 carbons; and wherein said epoxy acetals contain from 2 to 4 epoxy groups.

2. 2 - alkyl - 4,5 - di(1 - methyl - 1,2 - epoxyethyl)-1,3-dioxolane of not more than 22 carbon atoms in said alkyl group.

3. 2-carbocyclic aryl-4,5-di(1-methyl-1,2-epoxy-ethyl)-1,3-dioxolane of not more than 22 carbon atoms in said carbocyclic aryl group.

4. 2 - cycloalkyl - 4,5 - di(1 - methyl - 1,2 - epoxyethyl)-1,3-dioxolane of not more than 22 carbon atoms in said cycloalkyl group.

5. 2 - bicycloalkyl - 4,5 - di(1 - methyl - 1,2 - epoxyethyl)-1,3-dioxolane of not more than 22 carbon atoms in said bicycloalkyl group.

6. 2 - cycloalkenyl - 4,5 - di(1 - methyl - 1,2 - epoxyethyl)-1,3-dioxolane of not more than 22 carbon atoms in said cycloalkenyl group.

7. 2 - bicycloalkenyl - 4,5 - di(1 - methyl - 1,2 - epoxyethyl)-1,3-dioxolane of not more than 22 carbon atoms in said bicycloalkenyl group.

8. 2 epoxyalkyl - 4,5 - di(1 - methyl - 1,2 - epoxyethyl) - 1,3-dioxolane of not more than 22 carbon atoms in said epoxyalkyl group.

9. 2 - epoxycycloalkyl - 4,5 - di(1 - methyl - 1,2 - epoxyethyl)-1,3-dioxolane of not more than 22 carbon atoms in said epoxycycloalkyl group.

10. 2 - epoxybicycloalkyl - 4,5 - di(1 - methyl - 1,2-epoxyethyl)-1,3-dioxolane of not more than 22 carbon atoms in said epoxybicycloalkyl group.

11. 2 - propyl - 4,5 - di(1 - methyl - 1,2 - epoxyethyl)-1,3-dioxolane.

12. 2 - (6 - methyl - 3 - cyclohexenyl)-4,5-di(1-methyl-1,2-epoxyethyl)-1,3-dioxolane.

13. 2 - (6 - methyl - 3,4 - epoxycyclohexyl) - 4,5-di(1-methyl-1,2-epoxyethyl)-1,3-dioxolane.

References Cited in the file of this patent

UNITED STATES PATENTS

| | | |
|---|---|---|
| 2,862,007 | Stansbury et al. | Nov. 25, 1958 |
| 2,895,962 | Fischer | July 21, 1959 |